Sept. 7, 1954 M. MAESER 2,688,367
PROGRESSIVE LINE-CONTACT CUTTING MACHINE
Filed Dec. 28, 1951 7 Sheets-Sheet 1

Fig. 1.

Inventor
Mieth Maeser
By his Attorney

Fig. 2.

Inventor
Mieth Maeser
By his Attorney

Inventor
Mieth Maeser
By his Attorney

Fig. 6.

Sept. 7, 1954      M. MAESER      2,688,367

PROGRESSIVE LINE-CONTACT CUTTING MACHINE

Filed Dec. 28, 1951      7 Sheets-Sheet 5

Inventor
Mieth Maeser
By his Attorney

Inventor
Mieth Maeser
By his Attorney

Patented Sept. 7, 1954

2,688,367

UNITED STATES PATENT OFFICE 2,688,367

PROGRESSIVE LINE-CONTACT CUTTING MACHINE

Mieth Maeser, Beverly, Mass., assignor to United Shoe Machinery Corporation, Flemington, N. J., a corporation of New Jersey Application December 28, 1951, Serial No. 263,901

18 Claims. (Cl. 164—19)

This invention relates to machines for cutting sheet material and is herein illustrated as embodied in a progressive, line-contact cutting machine.

So-called clicking machines for cutting blanks from sheet material are in widespread use and are employed, for example, in the cutting of the parts of shoe uppers. They embody a cutting block upon which the work is placed with a cutting die resting on the work. Above these is a swinging beam which can be moved aside to permit the operator to place the die upon the work and then brought back into position above the die whereupon, at the will of the operator, this beam is moved vertically to force the die through the work. Such machines, depending upon various factors, including the size of the dies and the nature of the material to be cut, require a considerable amount of power to force the die through the work and subject the building to annoying vibration. Furthermore, the repeated use of the machine roughens the surface of the cutting block to such an extent that the dies do not always cut the work cleanly.

One suggestion for lessening the amount of power required and for reducing the weight of the machine has been the thought that cutting may be done progressively by the use of one or more rollers passed between the bed and the abutment to progressively force the die through the work by bringing pressure to bear progressively across the area of the die.

An object of the invention is to provide an improved machine for progressive, line-contact cutting which will require less power and which will rapidly perform the cutting operation efficiently and cleanly.

A feature of the invention resides in an improved arrangement of the component parts in a machine of the type in which the beam, while swingable to facilitate the placement of the die on the work, is not moved vertically during the operation of the machine, and in which the work is progressively forced against the cutting edges of the die by means of a series of presser rolls underlying a cutting bed and moved along a path parallel to the face of the beam which usually is a pressure-applying member but which here serves as an abutment. With this arrangement, it is only necessary to move the rolls linearly as far as the distance between the axes of successively acting rolls in order to cover the whole area of the cutting die.

Still another feature of the invention consists in staggering the following rolls of the series and arranging them to slightly overlap at the ends. As illustrated these rolls of the series are carried in a series of bearings on a movable carriage which travels over a hill and dale cam having hill portions parallel to the surface of the beam.

Another feature of the invention resides in the improved construction of the cutting bed which, as illustrated, is made up of a series of strips of thin steel tensioned lengthwise of the cutting bed and a superposed blanket of suitable cutting material. Various such materials are available for the blanket including linoleum, raw hide, a sheet of vinyl plastic, and many others.

Provision is made herein, in accordance with still another feature of the invention, for moving this cutting blanket a short distance between each cutting operation. Preferably, and as illustrated, this plastic material is carried on reels at the ends of the cutting bed and mechanism is provided for winding the material on the reel at one end of the machine whenever the carrier for the presser rolls descends into a dale at the end of the cutting operation.

Another feature of the invention which renders such plastic materials even more economical consists in the provision of a heated bar under which the sheet of plastic material is dragged as it is moved along. This heated bar serves to heal the cuts in the surface of the plastic so that, when the sheet is used again, the cuts made therein by the die will be healed and the quality of the cutting action will not be affected by nicks or notches in the material on which the work rests.

These and other features of the invention will best be understood from a consideration of the following specification, taken in connection with the accompanying drawings, in which.

Figure 2:
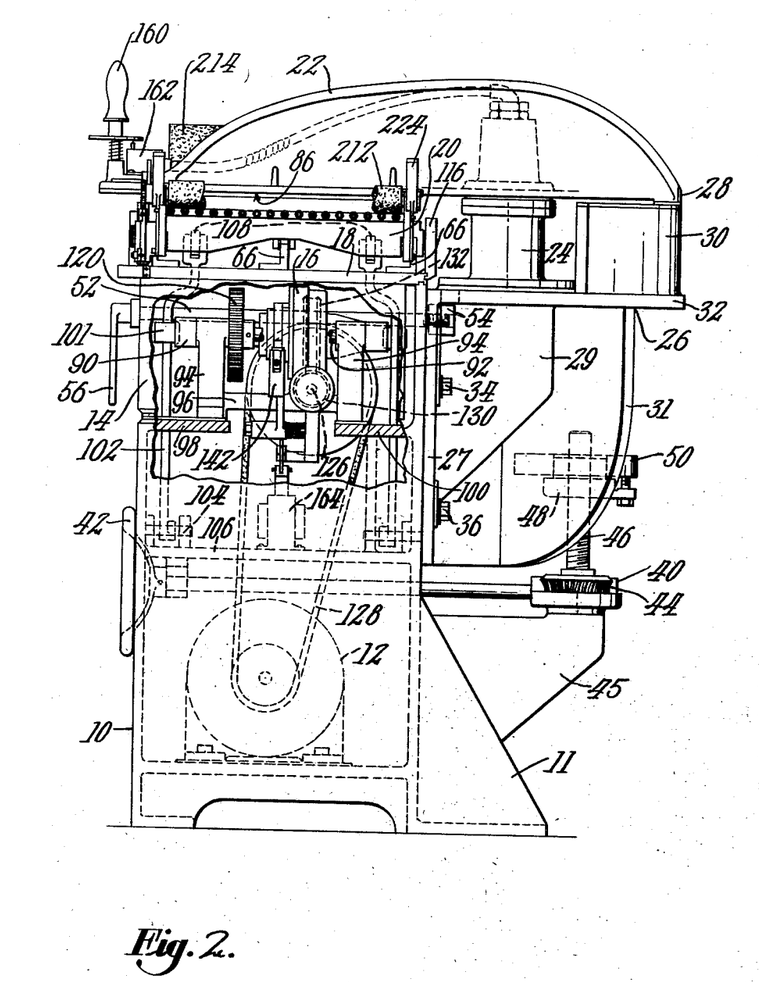
Fig. 2 is an end elevation, taken from the right in Fig. 1, with parts broken away and in section.
Figure 3:
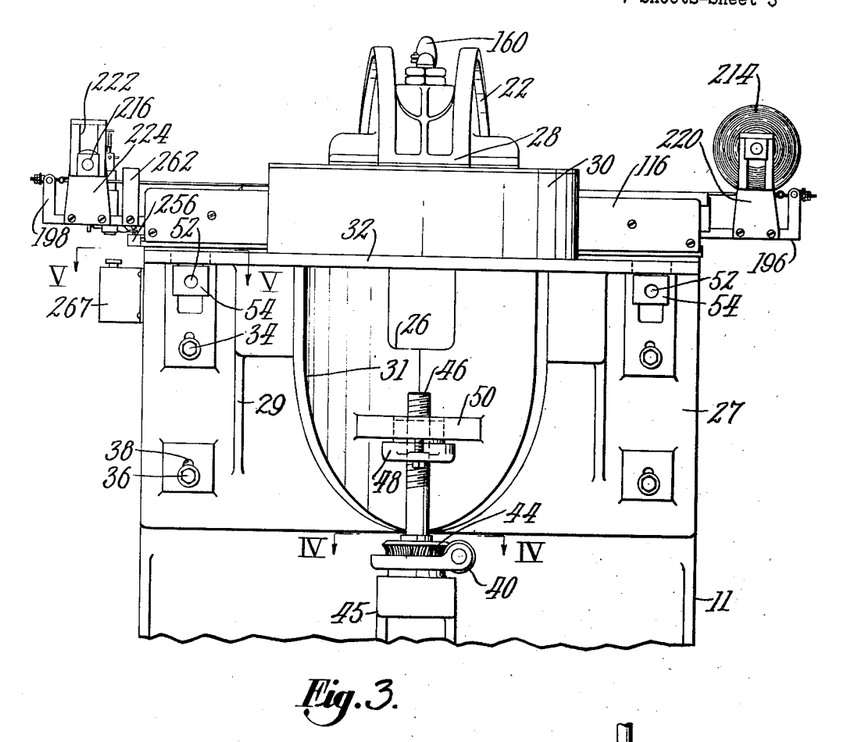
Fig. 3 is a rear elevation of the machine.

The machine is built on a box-like frame (Figs. 1, 2 and 3) comprising a base portion 10 having a back brace 11, and in which there is supported a driving motor 12. The frame also includes an upper portion 14 housed within which there is a driving mechanism including a clutch 16. At the top of the upper portion 14 there is supported a plate 18 upon which is mounted a reciprocatory carriage 20 forming part of the presser mechanism.

Figures 4, 5:
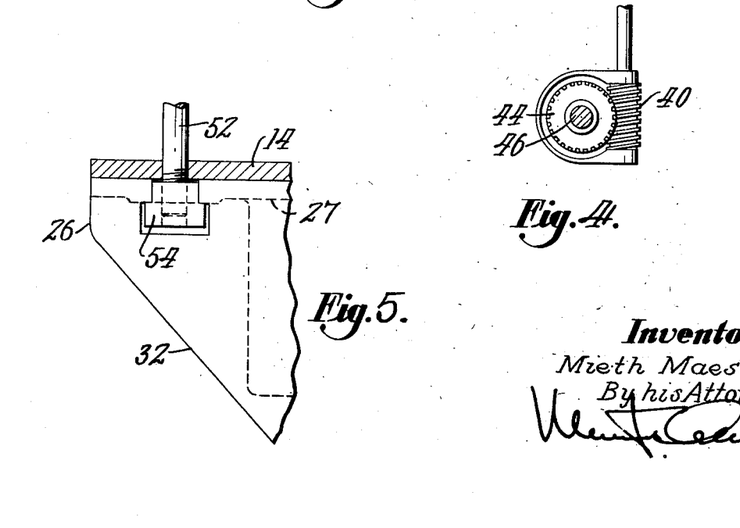
Figs. 4 and 5 are sections taken on the lines IV—IV and V—V in Fig. 3 and show details of a device for adjusting the height of the beam.

A swinging beam 22 which serves as an abutment to resist the cutting action is pivotally mounted upon a post 24 carried by a bracket 26, having a back plate 27 which is bolted to the frame members 10 and 14, and having flanges 29, 31 and a top plate 32. It will be observed that there is no vertical movement of the beam during the operation of the machine and that an overhanging portion 28 extending rearwardly of its pivot slides along the top edge of a curved supporting brace 30 which rises from the top plate 32 of the bracket 26. Bolts 34, 36 pass through elongated slots 38 (Fig. 3) in the back plate 27 of the bracket 26 to guide the same and to permit the requisite slight adjustment needed in order to accommodate different heights of dies. The heightwise movement of the bracket may be effected by means of a screw 40 having a hand wheel 42 at the front of the machine. This screw meshes with a worm gear 44 resting on a bracket 45 and carrying a screw 46 which is threaded in a nut 48 resting under a lip 50 forming part of the bracket 26. For clamping the bracket in adjusted position, screws 52 (Fig. 2) extend through the frame 14. The screws are threaded in T-blocks 54 (Fig. 5) resting against a slotted portion of the bracket back plate 27 and are provided with handles 56 at the front of the machine.

Figure 7:
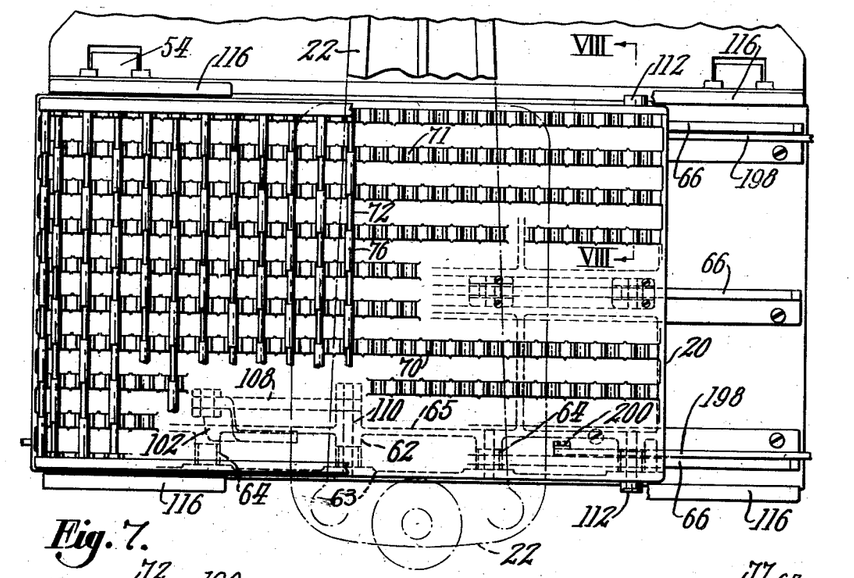
Fig. 7 is a plan view showing the carriage for the presser rolls.
Figure 8:
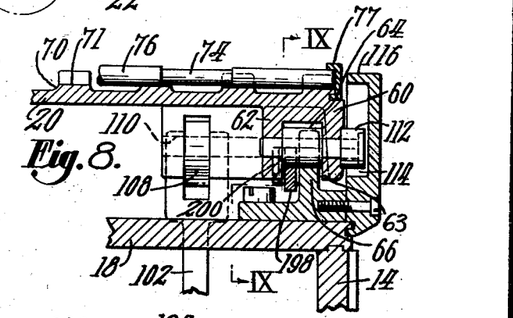
Fig. 8 is a section on the line VIII—VIII of Fig. 7 showing how the carriage is supported upon cam tracks.

The reciprocatory carriage 20 has a depending rim 60 having thickened portions 63 (Fig. 7). Inside of these portions are lugs 62 formed on a rib 65. Between them are supported a series of carrier rolls 64 which rest upon the upper edges of a pair of hill and dale cam tracks 66 shown in section in Fig. 8. These are screwed to the top plate 18 of the frame and have a hill and dale configuration shown in Figs. 1 and 9.

Figure 9:
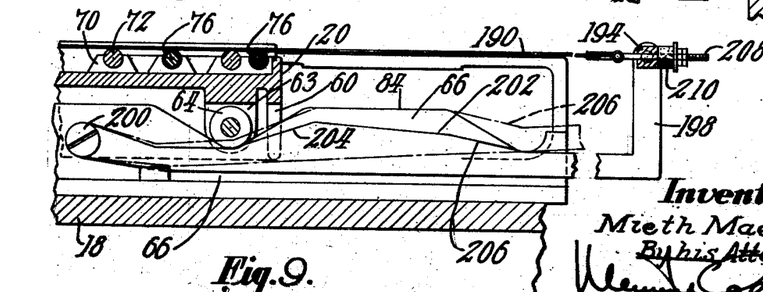
Fig. 9 is a section on the line IX—IX of Fig. 8 extending longitudinally of the cutting bed and illustrating a fragment of a cam track.
Figure 10:
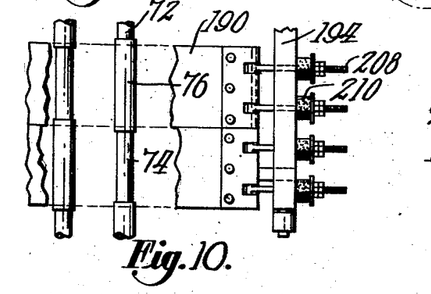
Fig. 10 is a detail on a larger scale of the means for tensioning the steel strips of the cutting bed and also showing the relation thereto of the staggered rolls of the presser member.

On the top face of the carriage 20 is a series of bearing members 70 the configuration of which is shown in Fig. 9. Resting in the cups 71 (Fig. 8) of these bearing members are cylindrical rods 72 which are reduced at 74 to leave rolls 76 which rest in these cups and are held against axial displacement by channels 77 (Figs. 8 and 1) fastened to the carriage. It will be note from Fig. 7 that the rolls 76 are staggered so that in the direction of the cam tracks 66 the successive rolls are on alternate rods. It will also be noted from Fig. 10 that the roll portions 76 are longer than the reduced portions 74 so that the rolls on successive rods overlap one another.

Figures 14, 15, 16, 17:
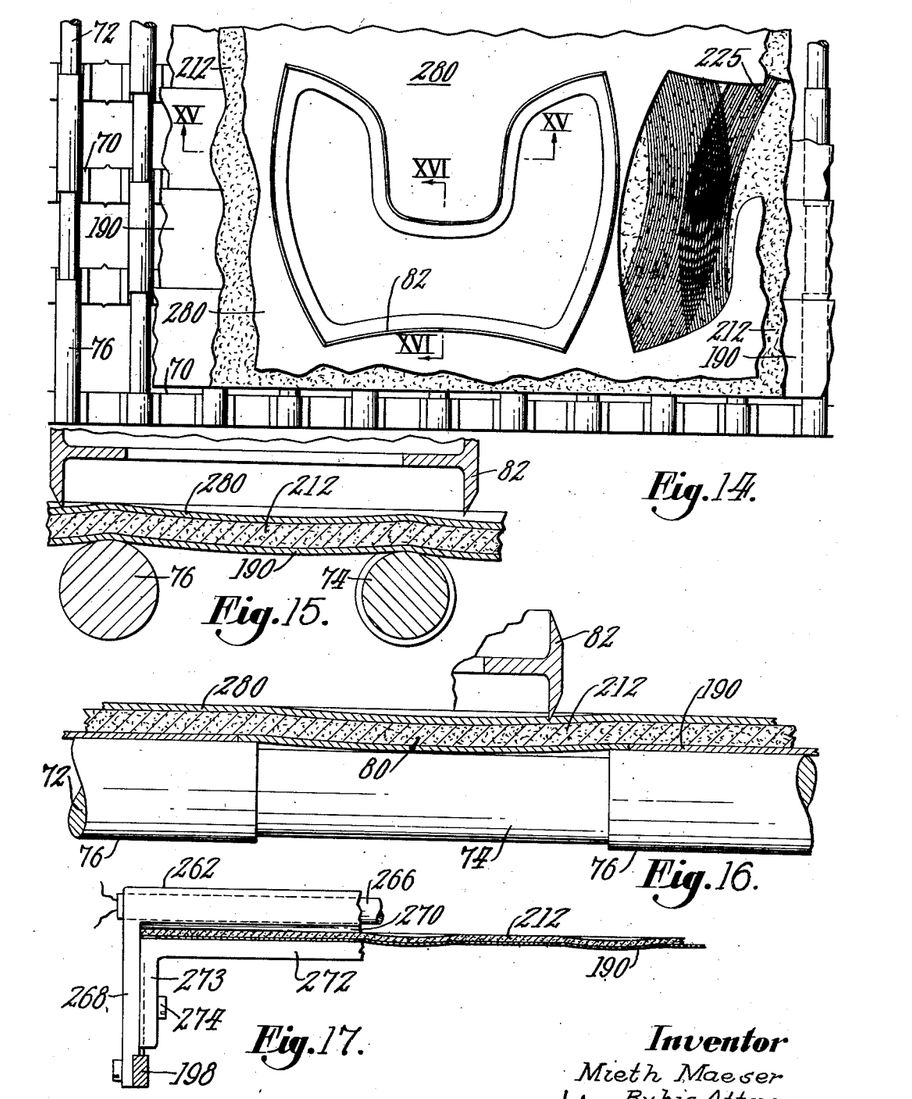
Fig. 14 is a fragmentary plan view showing a die and a piece of work resting on the cutting bed and broken away to show the relation of the presser rolls thereto.
Fig. 15 is a vertical section on the line XV—XV of Fig. 14 but at a larger scale to illustrate the progressive cutting action.
Fig. 16 is a similar view taken on the line XVI—XVI in Fig. 14 but at a larger scale and illustrating the action of the spaced rolls of the presser member.
Fig. 17 is a vertical section on the line XVII—XVII of Fig. 1 to show the relation of a heated bar to the blanket to renew the surface thereof.

By this arrangement the power required to drive the machine is reduced because a portion of the blank, which happens to lie substantially parallel to the axes of the rods 72, will not be cut throughout its whole length by a single presser roll. Instead, the portion of the cutting bed 80 (Fig. 16) which lies between the two rolls 76 on the same rod will sag slightly and will not press the work over this part of the cutting edge of a die 82. Referring to Fig. 9, it will be noted that the length of a hill 84 on one of the cam tracks 66 is slightly longer than the distance between two work-lifting or presser rolls 76 thereby forcing a second or following roll to act upon every portion of the outline being cut. Furthermore, each hill 84 is parallel to the under surface of the beam 22 as may be seen from Fig. 1 thereby moving the active surface of each roll along a path which is parallel to the under surface 86 of the beam. Between the successive hills 84 are dales 88 which allow the rolls 64 on the carriage 20 to descend to a level where the presser rolls 76 on the carriage are no longer effective to push the work over the cutting edge of the die.

The reciprocation of the carriage is effected by cranks 90 at the outer ends of a crankshaft 92 (Fig. 1) which shaft is supported in bearings 94 (Fig. 2) formed in a bearing block 96 which is supported upon shelves 98, 100 at the top of the lower frame portion 10. The cranks 90 are connected by links 101 to arms 102 pivoted at 104 in lugs carried by an intermediate shelf 106 of the lower frame 10. The upper ends of these arms 102 are joined by short links 108 (Figs. 1 and 7) to pins 110 on the carriage 20. For the prevention of abnormal displacement of the carriage during its operation there are projecting rolls 112 which ride in the recesses 114 (Figs. 1 and 8) of guard plates 116 attached to the outer cam tracks 66. The shape of these recesses 114 may be seen in Fig. 1. Further to receive the shock of movement of the carriage 20 to the right, the rim 60 is provided with a notch 113 engaging an upright 115 attached to a track 66.

The crankshaft 92 is provided with a large gear 120 which meshes with a small gear 122 (Fig. 1) secured to a rotor shaft 124 which forms part of a rolling pin clutch enabling the operator intermittently to reciprocate the carriage at will. The two to one relation of the gears 120 and 122 enables the use of a one-revolution clutch for driving the gear 122 so that at each operation of the clutch the crank 90 will be turned through 180°. Power from the motor 12 is delivered to a worm shaft 126 by multiple V-belts 128 and the shaft 126 is provided with a worm 130 (Figs. 2 and 6) and this meshes with a worm gear 132 freely rotatable on the rotor shaft 124.

The clutch which is interposed between this worm gear 132 and the rotor shaft 124 is substantially the same construction as that shown more completely in United States Letters Patent No. 2,202,005, granted May 28, 1940 upon application of Eric A. Holmgren to which reference may be made for a more complete description. Fastened to the worm gear 132 is a cam ring 134 having internal projections 136 and associated recesses. The driving connection between the shaft and this ring is established when the slabbed-off pin 138 is released by a latch 140 and is rolled by a spring 141 into engagement with one of the projections 136 thereby driving the rotor shaft 124 in a clockwise direction as viewed in Fig. 6.

Figure 6:
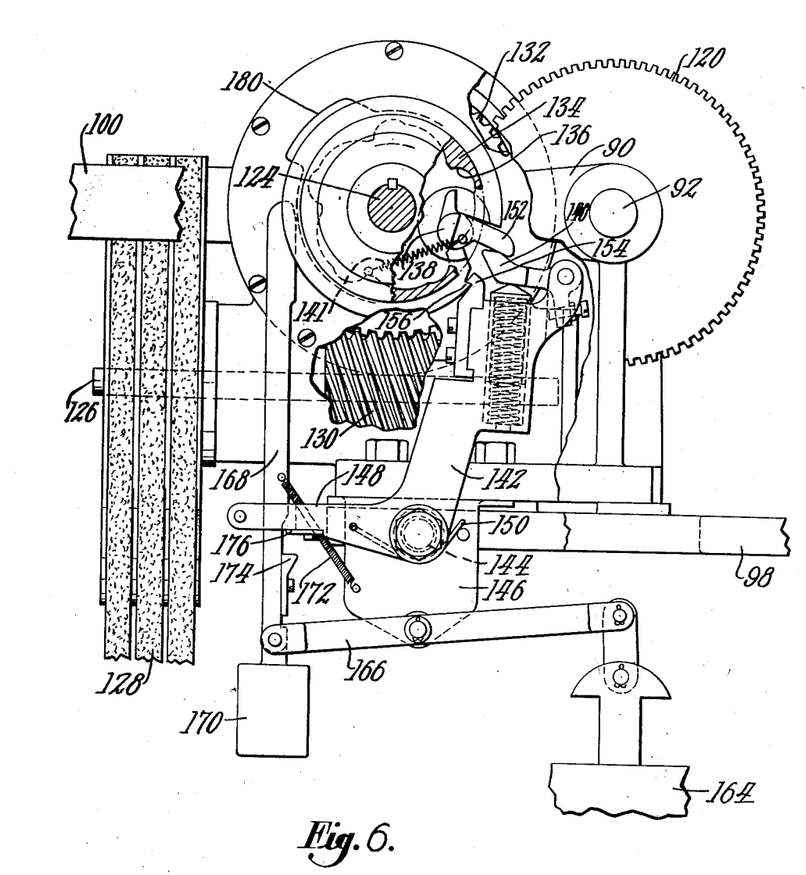
Fig. 6 is a front elevation, on a larger scale, of the clutch mechanism.

The latch 140 is pivoted upon an arm 142 carried by a stud 144 in a bracket 146 which is attached to the bearing block 96. Secured to the arm 142 is another arm 148 and the two together form a bell crank which is normally rotated by a spring 150 to hold the latch 140 against the rotor 124 and in position to receive a stop arm 152 at the end of a single revolution, thus rolling the pin 138 to disengage the driving connection. A hook-shaped lug 154 on the arm 142 is positioned to engage a shoulder 156 upon the rotor to prevent any rebound at the end of a single revolution.

Figure 1:
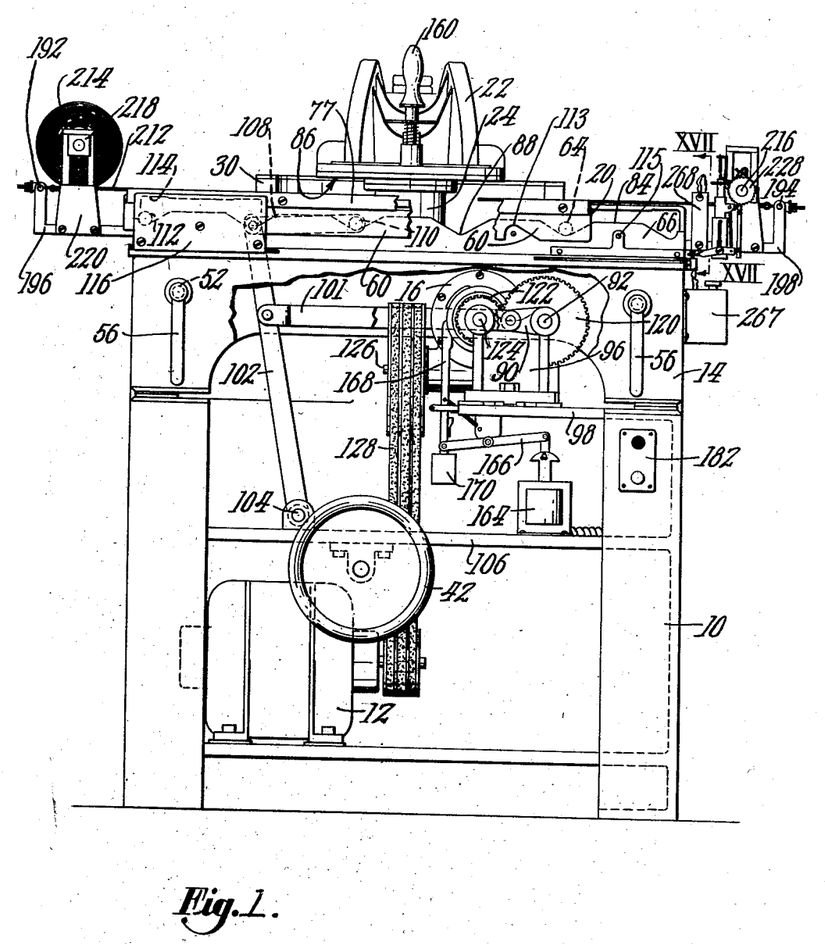
Fig. 1 is a front elevation of the machine.

A control handle 160 on the swinging beam 22 is mounted to cooperate with a switch 162 (Fig. 2) connected electrically to a solenoid 164 (Figs. 1 and 6) joined to one end of a lever 166. This lever is pivoted on the lower end of the bracket 146 and is joined at its other end to an upright extension 168 having a counterbalance 170 and with its upper end held against the rotor of the clutch by a spring 172. On this extension there is a lug 174 positioned to engage a plate 176 on the under side of the bell crank arm 148 so that when the extension 168 is raised by the energization of the solenoid 164 it will turn the bell crank to pull the latch 140 out from under the stop arm 152, thus allowing the rolling pin to effect a driving connection and causing a single rotation of the rotor shaft 124. Near the end of that rotation a projecting cam 180 connected to the rotor rubs against the upper end of the extension 168 swinging it counterclockwise around its connection to the lever 166 and withdrawing the lug 174 from its engagement with the plate 176, thus allowing the spring 150 to force the arm 142 counterclockwise to bring the latch 140 in the path of the stop arm 152. The starting and stopping of the motor 12 is controlled by a switch 182 (Fig. 1).

The work and a cutting die are piled upon a cutting bed 80 including steel strips 190 (Fig. 10) stretched between cross rods 192, 194 (Fig. 1) which extend between pairs of elbow arms 196, 198, these arms being pivotally mounted by screws 200 (Figs. 7, 8 and 9) upon the inner sides of the cam tracks 66 in a position alongside those tracks and between the depending lugs 60, 62 of the carriage 20 (Fig. 8) so that they lie beneath the carriage rolls 64 thus allowing the steel strips 190 to be held taut across the tops of the rolls 76 but to rise with those rolls when the carriage rollers 64 are lifted by traveling over the hills 84 of the cam tracks.

To this end, the elbow arms 198 are provided with flats 202 (Fig. 9) which correspond with the hills 84 and with slopes 204 and 206 of such a contour that the cutting bed strips 190 will be held in taut engagement with the rollers 76 when the carriage 20 descends into the dales of the cam tracks. It will be seen from Fig. 10 that the strips 190 are secured to the cross rods 192 and 194 by pairs of threaded rods 208 pivotally attached to the ends of the strips. These rods have nuts bearing upon rubber washers 210 which rest against the outer sides of the cross rods thus allowing the strips to be tensioned individually so as to avoid buckling. The use of individual strips avoids any tendency to distortion of the cutting bed by the action of the rolls 76 and makes the structure more economical when it is considered that the strips themselves are preferably made of clock spring steel usually supplied only in strips of moderate width.

Overlying the steel strips 190 and forming part of the cutting bed 80 is a flexible blanket 212 which may be of various materials but conveniently may be thought of as constructed of a vinyl plastic. This blanket is carried from a supply reel 214 (Fig. 1) to a take-up reel mounted upon a shaft 216 at the right end of the machine. In order to accommodate the varying diameters of the rolls of plastic material the supply reel is carried in slidable bearings 218 held by brackets 220 upon the elbow arms 196. Similarly the shaft 216 of the take-up reel is carried by slidable bearings in slots 222 of brackets 224 mounted on the elbow arms 198.

It will be understood that it is desirable to shift the blanket slightly lengthwise of the machine after each cutting operation in order that the indentations 225 (Fig. 14) of successive cuts may be spaced apart. Accordingly, an automatic wind-up mechanism is associated with the take-up shaft 216 and this is shown more particularly in Figs. 11, 12 and 13. It is so constructed that it will be operatively connected to the shaft 216 regardless of the size of the roll of blanket material thereon and for this reason spring-pressed operating pawls 226 associated with a ratchet 228 on the take-up shaft 216 are pivoted in a slide 230 which, when released, is drawn up by a spring 232 carried by a plate 234 fastened to the top of the slidable bearing block for the shaft 216. Upon this same plate there is a retaining pawl 236 to prevent retrograde movement of the ratchet 228. Also mounted on the same plate is a stop 238 in line with the top of the slide 230.

This slide 230 is carried in a sleeve 240 which in turn fits inside a casing 242 supported by a bracket 244 on one of the elbow arms 198. It will be noted that the casing 242 supported upon the elbow arm and all the parts in that casing participate in the up and down movements of the elbow arms 198 resulting from the reciprocatory movement of the carriage rolls 64 from hill to dale positions as indicated by the dotted and full lines in Fig. 11. It will also be noted that the sleeve 240 is arranged to be connected to the slide 230 by a friction lock embodying a locking arm 246 which is pivotally mounted in lugs on the sleeve 240.

Figure 11:
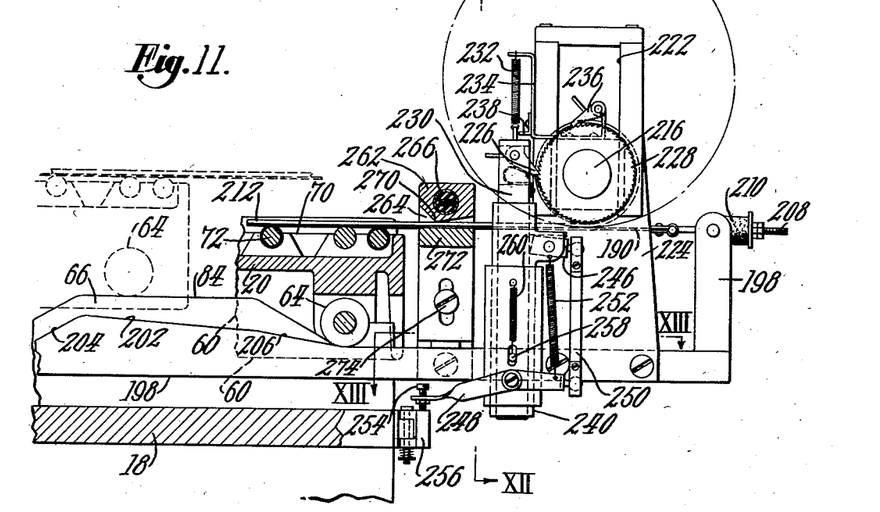
Fig. 11 is another longitudinal section through the end portion of the head of the machine including the end of the cam track, the presser roll carriage and the cutting bed and showing the mechanism for moving a plastic blanket lengthwise of the cutting bed.
Figures 12, 13:
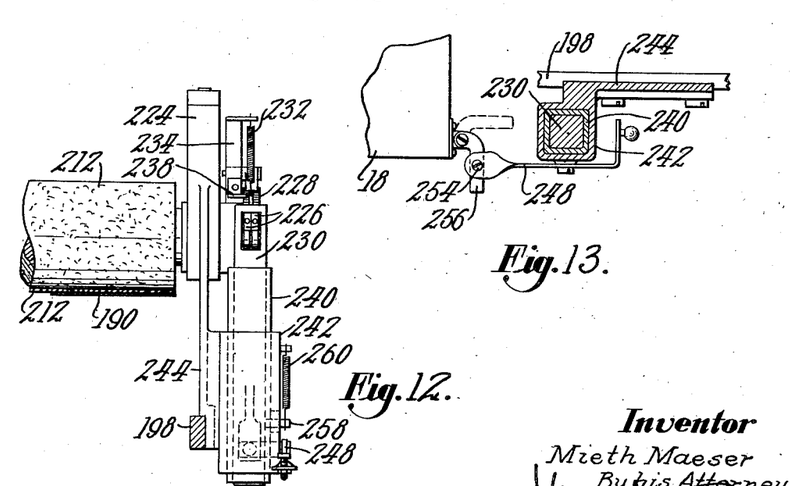
Fig. 12 is a section on the line XII—XII of Fig. 11 to show details of the blanket-advancing mechanism.
Fig. 13 is a horizontal section on the line XIII—XIII of Fig. 11 through a portion of the advancing mechanism.

This locking arm 246 participates in movements of a lever 248 pivoted on the casing because of a connecting link 250 having ball and socket connections to the two. A spring 252 normally raises the link 250 as the elbow arm 198 rises, thus releasing the friction lock between the sleeve and the slide. However, every time the elbow arm is pushed down by the carriage roll 64 the lever 248 is rotated by the engagement of its contact screw 254 with an abutment arm 256 pivoted on the end of the top plate 18 of the frame. This allows the movement of the blanket to be interrupted, if desired, by swinging aside the abutment arm 256.

Accordingly, every time the elbow arm 198 is raised by the lifting of the steel strips as the carriage roll 64 goes to its upper position, the casing 242 is raised carrying with it the sleeve 240 and releasing the friction grip of the locking arm 246. This allows the spring 232 to draw up the slide 230 until it is stopped by the lug 238. In so doing the pawls 226 will ride over the teeth of the ratchet 228. On the other hand, when the elbow arm 198 drops, the lever 248 will be turned by engaging the abutment arm 256 and will lock the slide 230 to the sleeve 240 thereby pulling down the pawls and rotating the ratchet to wind up the blanket. A lost-motion connection between the sleeve 240 and the casing 242 is provided by a pin 258 in the sleeve projecting through a slot in the casing. A spring 260 tends to raise the sleeve to its uppermost position.

The healing of cuts 225 is effected by a crossbar 262 having a slot 264 through which the blanket travels. This crossbar is heated by an electric unit 266 having a control unit 267 (Fig. 1). The crossbar 262 has depending arms 268 (Fig. 17) which are secured to the elbow arms 198 at the opposite sides of the machine. It will be seen that at an intermediate point of the slot 264 a depending rib 270 is formed in the under side of the crossbar and the blanket as well as the steel strips 190 are pressed upwardly by a support 272 having depending ends 273 which are adjustably connected to the arms 268 of the crossbar 262 by screws 274 passing through slots in the ends 273 of the support 272. This allows the blanket to be held against the rib 270 with just the required pressure.

In the use of the machine, the beam 22 will be swung aside and a piece of work 280 (Fig. 14) will be laid upon the blanket 212 forming part of the cutting bed 80. A die 82 will be superposed upon the work and the beam swung back into position overlying the die. The operator of the machine will then depress the handle 160 slightly to operate the solenoid 164 thereby closing the clutch and causing a half revolution of the crank arms 90. This will draw the carriage 20 along the cam tracks 66 for a distance such that the carriage rolls 64 travel from one dale over a hill 84 and to the next dale. In so doing the rollers 76 on the carriage will raise the cutting bed at spaced points to force the work 280 progressively over the cutting edges of the die 82.

As was explained previously the staggered relation of the rolls reduces considerably the amount of power required for the reciprocation of the carriage especially in a case where an elongated portion of the cutting edge of the die is substantially parallel to the axes of the rolls. With this lessened expenditure of power and the line contact cutting action, the amount of vibration transferred to the building is also greatly lessened. The length of the stroke of the carriage is such that all portions of the cutting edge are pushed through the work and a clean cut is effected. At the end of a single revolution of the clutch the driving mechanism is disconnected and the machine stopped with the cutting bed in lowered position so that the beam may be swung aside and the die moved to its next location.

Having thus described my invention, what I claim as new and desire to secure by Letters Patent of the United States is:

1. A progressive cutting machine comprising an abutment, a flexible cutting bed for supporting a piece of work and a cutting die in superposed relation to one another, a presser mechanism comprising a series of rolls, means for moving said rolls beneath the cutting bed, and guide cams for shifting the presser rolls toward the abutment and then along a path parallel to the face of the abutment.

2. A progressive cutting machine comprising an abutment, a flexible cutting bed for supporting a piece of work and a die in superposed relation, a presser mechanism comprising a carriage supporting a series of staggered rolls, means for moving said carriage beneath the cutting bed, and guide cams for determining the cutting path of the carriage at a level to force the die through the work, said path being substantially parallel to the face of the abutment.

3. A progressive cutting machine comprising an abutment, a flexible cutting bed for supporting a piece of work and a die in superposed relation, a presser mechanism comprising a carriage having rolls thereon spaced axially transversely of the carriage, parallel rolls thereon which are similarly spaced, and an intermediate series of rolls in staggered relation to the first rolls, and means for reciprocating said carriage and holding it at such a level parallel with the abutment as will force the die through the work.

4. A progressive cutting machine comprising an abutment, a flexible cutting bed for supporting a piece of work and a die in superposed relation, a presser mechanism comprising a carriage having rows of bearings, a series of cylindrical members extending transversely of said carriage and resting in the bearings, said cylindrical members having reduced portions leaving intermediate rolls, the rolls upon alternate cylindrical members being staggered, and means for moving said carriage along a path parallel to the face of the abutment at a level which will force the die through the work.

5. A progressive cutting machine, comprising a support, a base, tracks along the front and rear edges of said base, a carriage rollable on said tracks, said tracks being provided with level portions and with a series of recessed portions or dales, power means for moving said carriage from one dale to the next, said carriage having at least one presser roll, a flexible cutting bed positioned above the presser roll to support a piece of work and a die in superposed relation to one another, and a beam swingable about the rear side of the base at a predetermined level.

6. A progressive cutting machine, comprising a support, a base, tracks along the front and rear edges of said base, a carriage rollable on said tracks, said tracks being provided with level portions and with a series of recessed portions or dales, power means for moving said carriage from one dale to the next, said carriage having at least one presser roll, a flexible cutting bed positioned above the presser roll to support a piece of work and a die, a beam swingable about the rear side of the base at a predetermined level, and means including an operator-controlled handle at the front of the base for adjusting the predetermined level at which the beam is swingable.

7. A progressive cutting machine comprising an abutment, a flexible cutting bed for supporting a piece of work and a die, a presser mechanism comprising a movable carriage having rows of bearings, a series of rods extending transversely of said carriage resting in the bearings, said rods having spaced rolls thereon, the rolls upon alternate rods being staggered and overlapping, and means for moving said carriage along a path parallel to the face of the abutment at a level which will force the die through the work.

8. A progressive cutting machine comprising an abutment, a flexible cutting bed for supporting a piece of work and a die, a presser mechanism comprising a carriage having successive rolls, hill and dale guide tracks supporting said carriage with the hills having flat surfaces parallel to the face of the abutment and at least as long as the space between successively acting rolls, and means for reciprocating the carriage from one dale to the next.

9. A progressive cutting machine, comprising a rectangular base, parallel hill and dale guide tracks extending across said base, a carriage riding on said tracks, said carriage having bearing strips provided with a series of cupped bearings, parallel rolls supported in said bearings, a flexible cutting bed stretched across said rolls and fixed against movement therewith, and an abutment adapted to be positioned above a piece of work and a cutting die piled on said bed, means to move said carriage from one dale to the next, and guards to prevent abnormal displacement of the carriage with respect to the tracks.

10. A progressive cutting machine comprising an abutment, a flexible cutting bed for supporting a piece of work and a die in superposed relation, a presser mechanism comprising a carriage having successive rolls with alternate rolls of a series staggered in position transversely of the carriage, hill and dale guide tracks for said carriage with the tops of the hills parallel with the face of the abutment and at a level to force the dies through the work, and means for moving the carriage from one dale to the next.

11. A progressive cutting machine comprising an abutment, a flexible cutting bed supporting a piece of work and a die in superposed relation beneath said abutment, means acting on successive portions of said bed to lift it progressively toward the abutment, said cutting bed comprising a series of parallel, closely adjacent, strips of thin metal, a common support for adjacent ends of said strips, said support being mounted for limited upward movement as the bed is lifted, and means coacting with said common support for individually tensioning said strips.

12. A progressive cutting machine comprising an abutment, a flexible cutting bed supporting a piece of work and a die in superposed relation beneath said abutment, said cutting bed comprising a series of tensioned parallel, closely adjacent, strips of thin metal, and a roll-carrying presser member reciprocable beneath said strips at a level to force the work against the die, the successive rolls of the presser member overlapping the joints between the adjacent strips in opposite directions.

13. A progressive cutting machine comprising an abutment, a flexible cutting bed supporting a piece of work and a die beneath said abutment, a roll-carrying presser means to forcibly raise the cutting bed progressively toward the abutment, said cutting bed comprising a series of parallel strips of thin metal, means for individually tensioning said strips, and a support for an end of said cutting bed movable heightwise toward and away from said abutment thereby to facilitate the raising of the bed by the presser.

14. In a progressive cutting machine, an abutment, a flexible cutting bed for supporting a piece of work and a die beneath said abutment, a carriage beneath the cutting bed, a roll in said carriage, a guide track for lifting said roll to press a portion of the die through the work and to move it progressively along a path parallel with the under face of the abutment, supports for the ends of said cutting bed, those at one end thereof being tiltable, and means associated with the carriage permitting the tiltable support to lift during the cutting movement of the carriage and operative to press the tiltable support down during the interval adjacent to the cutting movement.

15. In a progressive cutting machine, an abutment, a flexible cutting bed underlying said abutment to support a piece of work and a die, bracket arms for supporting the ends of the cutting bed, the arms at one end of the bed being tiltably mounted, movable presser means for intermittently raising the cutting bed to press the work against the die, and means movable with the presser means for controlling the tilting movement of said bracket arms.

16. A progressive cutting machine comprising a base, a flexible cutting bed stretched across said base, a swinging beam above the cutting bed to cooperate therewith in forcing a die against a piece of work, said beam being movable at a fixed level, a carrier reciprocable beneath said cutting bed having a roll progressively to raise the bed, an elongated blanket associated with said cutting bed, a supply reel at one end of said cutting bed, a take-up reel at the other end of said cutting bed, and spring means released at the end of the cutting movement of the presser roll for raising a pawl carrying slide operable to move said take-up reel.

17. A progressive cutting machine comprising a flexible cutting bed, supports for one end of said cutting bed comprising pivotally mounted arms, an abutment over said cutting bed and a presser member beneath the cutting bed having a roll in contact therewith, guide tracks for said presser member positioned alongside the tiltable arms with the presser member overlapping both the arms and the tracks, the configuration of the tracks comprising flat surfaces in parallel relation to the abutment and relieved surfaces adjacent thereto, said tiltable arms have upper surfaces which are similarly relieved thereby permitting the arms to be lifted by the upward movement of the presser roll when the presser member is riding along the flat surfaces and causing the cutting bed to be depressed when the presser roll is descending into the intermediate relieved portions.

18. A progressive cutting machine comprising an abutment, a cutting bed having a plastic blanket to support a piece of work and a die piled thereon beneath the abutment, means for pressing the cutting bed upwards to effect a cutting action and then allowing the blanket to drop away from the work, means for moving said plastic blanket longitudinally during the inoperative portions of the action of the pressing means, and a heated member for treating the surface of the sheet, as it is moved along, to cure the cuts therein.

References Cited in the file of this patent

UNITED STATES PATENTS

| Number | Name | Date |
|--------|------|------|
| 1,405,385 | Ballard | Feb. 7, 1922 |
| 1,505,212 | MacDonald | Aug. 19, 1924 |
| 1,894,486 | Freeman | Jan. 17, 1933 |
| 2,108,447 | Rosenberg | Feb. 15, 1938 |
| 2,223,454 | Maeser | Dec. 3, 1940 |
| 2,467,546 | Anderson | Apr. 19, 1949 |